(12) United States Patent
Hughes et al.

(10) Patent No.: US 7,404,337 B2
(45) Date of Patent: Jul. 29, 2008

(54) MASS FLOW METER WITH FLUID LENS

(75) Inventors: Nathaniel Hughes, Palm Springs, CA (US); Leon Shaw, Santa Monica, CA (US)

(73) Assignee: Fluid Energy Conversion, Inc., Palm Springs, CA (US)

( * ) Notice: Subject to any disclaimer, the term of this patent is extended or adjusted under 35 U.S.C. 154(b) by 0 days.

(21) Appl. No.: 11/501,491

(22) Filed: Aug. 8, 2006

(65) Prior Publication Data

US 2007/0157738 A1 Jul. 12, 2007

Related U.S. Application Data

(60) Provisional application No. 60/757,715, filed on Jan. 9, 2006.

(51) Int. Cl.
*G01F 1/37* (2006.01)
(52) U.S. Cl. .................................. 73/861.52
(58) Field of Classification Search ............... 73/861.52
See application file for complete search history.

(56) References Cited

U.S. PATENT DOCUMENTS

| 2,803,962 | A | * | 8/1957 | West | 73/861.61 |
| 3,455,161 | A | * | 7/1969 | Randall | 73/861.53 |
| 4,343,194 | A | * | 8/1982 | Dehart et al. | 73/861.65 |
| 5,892,146 | A | * | 4/1999 | Kobayashi et al. | 73/202.5 |
| 6,234,015 | B1 | * | 5/2001 | Hamada et al. | 73/202.5 |
| 6,684,692 | B1 | * | 2/2004 | Lenzing et al. | 73/202.5 |

* cited by examiner

*Primary Examiner*—Harshad Patel
(74) *Attorney, Agent, or Firm*—Buchanan Ingersoll & Rooney, LLP

(57) ABSTRACT

A flow metering apparatus possessing a housing with a chamber including and entrance and an exit for the passageway of fluid therethrough. A flow directing body is located in the chamber and includes first and second conical portions positioned on either side of a cylindrical portion. The body is supported in the chamber in a fixed manner. An orifice is located within the chamber upstream of the first conical portion of the body and is of a predetermined size to control the passage of fluid through the housing chamber. First and second sensors sense the dynamic pressures at the apex of the first conical portion and at a position between the body and a wall of the chamber.

25 Claims, 8 Drawing Sheets

MASS FLOW METER WITH FLUID LENS

REFERENCE TO RELATED APPLICATIONS

The present application claims priority to U.S. Provisional Patent Application No. 60/757,715 filed Jan. 9, 2006 and is related to U.S. patent application Ser. No. 10/373,302 filed Feb. 26, 2003. Both U.S. patent applications 60/757,715 and 10/373,302 are hereby incorporated by reference in their entirety.

BACKGROUND OF THE INVENTION

The present invention relates to a novel and useful flow metering apparatus which accurately measures mass flow.

The determination of characteristics of fluid flow is extremely important in the metering of fluids and the revelation of other characteristics such as density and the like. In the past, a novel flow meter has been devised and is found in our co-pending patent applications, Ser. Nos. 10/373,302 and 10/410,685, which are incorporated by reference in their entirety into the present application. The flow control devices described in those applications perform well in most fluid flow conditions, outperforming other prior art flow meters with respect to accurate determination of mass flow rates and density determinations. However, extremely high and extremely low flow operating ranges required the selection and use of separate flow bodies within the flow meter for a particular flow condition.

A flow meter which accurately determines flow rates and densities of fluids at low and high fluid flow operating ranges would be a notable advance in the art of metering devices.

SUMMARY OF THE INVENTION

It is therefore an object of the present invention to provide a fluid flow metering apparatus which is accurate through a large range of fluid velocities and mass flow rates of fluids passing through a particular passageway.

Another object of the present invention is to provide a fluid flow metering apparatus of the type described which accurately measures fluid mass flow rate and fluid density, and is virtually isolated from turbulence and instabilities in the flow stream occurring before and after the measurements are taken.

Another object of the present invention is to provide a fluid flow metering apparatus which is economical to produce on a large scale.

A further object of the present invention is to provide a fluid flow metering apparatus which is reliable in operation.

Another object of the present invention is to provide a fluid flow metering apparatus which has a high degree of sensitivity to changes in mass flow rates within the flow meter, irrespective of fluid turbulence in the vicinity of the probes.

A further object of the present invention is to provide a fluid flow metering apparatus which eliminates the need for a relatively large number of mass flow meters of different sizes to accommodate varying fluid flow conditions and parameters in the metering apparatus.

Still another object of the present invention is to provide a fluid flow metering apparatus which is capable of automatically determining fluid mass flow rates and fluid density determinations via adjunct electronic devices.

Yet another object of the present invention is to provide a fluid flow metering apparatus which is easily tuned to provide accurate measurements of fluid mass flow rate and density over a broad range of fluid velocities.

In accordance with a presently preferred embodiment of the present invention, a novel and useful fluid mass flow metering apparatus is herein provided which includes an elongated cylindrical housing having an interior wall portion forming a flow chamber. The chamber is open on both ends and includes an entrance and an exit for passing fluid through the chamber. The chamber is constructed of a predetermined size. A fluid flow directing body is located in the chamber to interact with the fluid flowing therethrough. The body includes a first conical portion positioned adjacent the chamber entrance, a second conical portion positioned adjacent the chamber exit and a cylindrical portion intermediately positioned relative to the first and second conical portions. The body is supported in the chamber in a generally fixed manner by one or more struts or pylons. The body may take various sizes commensurate with the size of the chamber and the flow conditions of the fluid intended to pass through the chamber.

An annular tuning member is located in the housing chamber between the body and the entrance to the housing chamber and includes a centrally located orifice of a predetermined size and shape to permit the passage of fluid therethrough The annular tuning member may be positioned along the axis of the body at various locations between the body and the chamber entrance and may also include a portion which overlaps the first conical portion of the flow directing body within the housing chamber. The length of the annular member as well as the diameter of its orifice may be varied in size to tune the accuracy of the flow measurements made by the present invention.

In addition to the heretofore mentioned elements, the preferred embodiment also includes a first pressure probe communicating with the chamber which obtains a first dynamic pressure measurement at the apex of the first conical portion of the flow directing body, and a second pressure probe that communicates with the chamber and obtains a second dynamic pressure measurement between the cylindrical portion of the body and the interior wall of the cylindrical housing. Thus, a dynamic pressure differential signal may be obtained from the two pressure measurements, and such differential pressure measurement may be employed to determine the fluid mass flow rate and the density of the fluid passing through the flow chamber of the apparatus.

Among the many advantages of the present invention are the following:

Simple modular construction - devices can be readily and cost effectively manufactured and mass-produced from a wide variety of materials with a variety of available manufacturing technologies.

Devices exhibit surprising "transparency"—producing minimal loss of hydrostatic static pressure head across the device at all measured flow rates.

Devices are Reynolds number insensitive and do not cause flow separation over the measured flow range.

Ultra-wide flow measurement range can exceed 100:1

Scalable design-sensors can be designed to accommodate virtually any line size and efficiently measure very low to very high fluid flow rates.

Design provides a completely programmable flow meter with a new low-cost versatile programmable module concept that allows reconfiguration of a given flow meter for a different operating range, while preserving signal levels and turn-down ratio.

Ability to reconfigure operating range of a given sensor by ~80:1.

Devices can measure fluid flow rates as low as ~1 cc/minute (lower flow limit restricted only by the ability to calibrate); no upper limit restriction.

Turn-down ratio>100:1.
Accuracies≦±0.5% of measured value appear achievable.
Can be used to measure both liquids and gases
    Gas Measurement
        Volumetric flow rate
        Mass flow rate (via P & T density measurement)
        Direct mass flow rate measurement can be achieved
    Liquid Measurement
        Volumetric flow rate
        Mass flow rate with known density (but with T compensation)
        Direct mass flow rate measurement can be achieved
Measurement is inherently bi-directional and accuracy is not affected by upstream/downstream bends, elbows, line diameter changes, valves, etc.
In use, straight runs or flow conditioners are not required.
Low pressure drop permits use in very low flow low energy systems.
Produces a linear signal under all operating conditions with simple direct square root signal processing over an extremely wide measurement range.
    Immune to flow regime (e.g. Reynolds Number) or other fluid physical properties.
No moving parts and non-clogging design.
Insertion design compatible.
Flexible design, low manufacturing cost.
No line-size or flow rate limitation
Accuracy not affected by upstream pressure and flow transients.
No need to calibrate on each gas species.
Response time<10 msec as compared to 0.5-1.5 sec for some competing technologies.
No laminar flow element (LFE) to clog or corrode.
Upstream pressure regulators and valves not required means reduced installation cost, less space needed.
Fewer component count means increased reliability, yields and cost.
Increased accuracy on short process "recipes" means increased yield and cost.
Increased reliability means less down-time, fewer spares and reduced cost.

Other objects and advantages of the present invention will become apparent to those skilled in the art after having read the following detailed disclosure of the preferred embodiment and variants thereof that are illustrated the several figures of the drawing.

BRIEF DESCRIPTION OF THE DRAWINGS

FIG. 11 is a chart graphically depicting mass flow rates relative to ΔP affected by changes in atmospheric pressure in the apparatus of the present invention.

DETAILED DESCRIPTION OF PREFERRED EMBODIMENTS OF THE INVENTION

Figure 1:
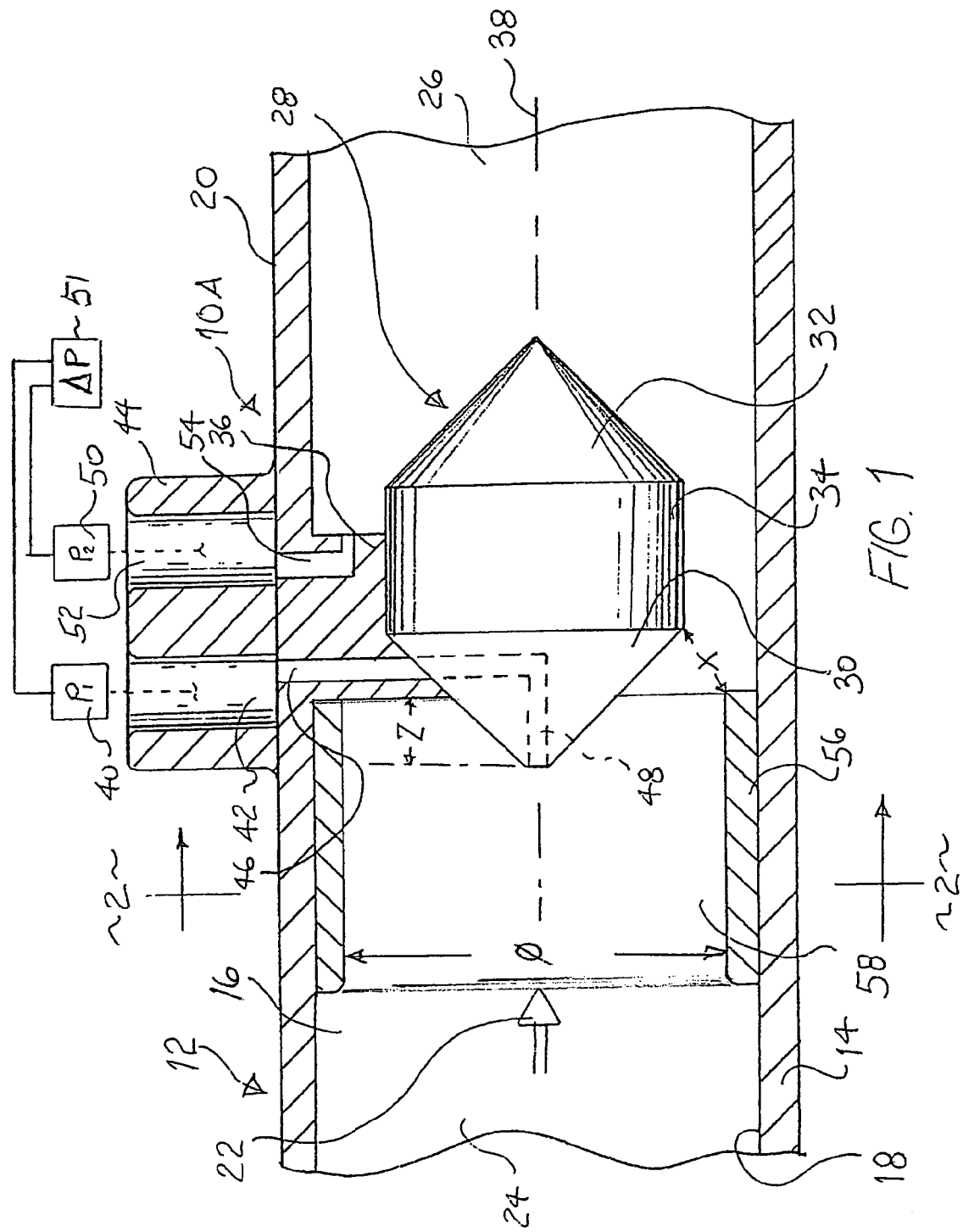
FIG. 1 is a longitudinal cross sectional view showing a flow metering apparatus having an annular tuning member with an orifice of a predetermined size, and a flow directing body in accordance with the present invention.

Various aspects of the present invention will evolve from the following detailed description of a preferred embodiment shown at 10A in FIG. 1 of the drawing, and variations thereof shown in part in FIGS. 2-7 of the drawing. Variations of the embodiment depicted in FIG. 1 shown in FIGS. 2-7 are denoted by a reference character 10 followed by an uppercase alphabetical letter to distinguish such embodiments.

With reference to FIG. 1, it may be observed that the fluid flow metering apparatus 1OA is depicted to include an elongated housing 12 in the form of a cylindrical and tubular configured 14 that may be made of any suitable metallic or plastic material. The inside surfaces of the tube 14 forms a flow chamber 16 which is generally circular in cross-sectional configuration. Tube 14 includes an inner wall 18 and an outer wall 20. In use, all or a part of the flow stream the flow rate of which is to be measured is passed through chamber 16, as indicated by directional arrow 22. The entrance 24 and exit 26 of the chamber are indicated on FIG. 1.

A flow directing body 28 is also depicted in FIG. 1 and includes a first or fore conical portion 30, a second or aft conical portion 32, and a cylindrical or mid-portion 34 joining the first and second conical portions 30 and 32. First conical portion 30 is located within chamber 16 adjacent chamber entrance 24, while the second conical portion 32 is located adjacent the exit 26 of chamber 16. Support means in the form of one or more struts or pylons 36 holds the body 28 in position within tube 20 such that the axes of first and second conical portions 30 and 32, as well as the axis of the mid section of the body 34 lie along a common axis, that is generally coincident with the axis of tube 14.

A first pressure sensing probe 40, for measuring a first dynamic pressure P1, and shown schematically in FIG. 1, is communicatively coupled to a passageway 42 formed in a boss 44, that communicates with a passageway 46 extending radially inwardly through the support means 36, and a passageway 48 that extends forwardly from the passageway 46 through the fore portion 30. Passageway 48 terminates in the apex, or vertex, of the fore conical portion 30.

A second pressure sensing probe 50, for measuring a second dynamic pressure P2 is also shown schematically in FIG. 1, is communicatively coupled to a passageway 52 formed in the boss 44 as well as a passageway 54 that extends through the support means 36 and terminates in chamber 16 at a point between the cylindrical portion 34 of flow body 28 and the tube wall 18 and out of any boundary layer to insure that dynamic pressure readings are obtained rather than static pressure readings. It will be appreciated that the pressure measurements PI and P2, although sensed outside of the flow chamber 16 by the sensors 40 and 50, may be simultaneously obtained and are directly proportional to the dynamic pressures appearing at the termini of passageways 48 and 54, and through use of a suitable processor 51, ΔP, may be obtained which is proportional to the mass flow rate $Q_M$.

The dynamic pressure difference $\Delta P = P_1 - P_2$ can be shown to relate directly to flow rate $Q_M$ starting with the expression:

$$P_1 - P_2 \sim \rho V^2$$

and where the conduit cross-sectional area of the flow stream is A, the volumetric flow rate $Q_v$ can be expressed as $$Q_v \sim A\sqrt{[(P_1-P_2)/p]}.$$

Accordingly, since the mass flow rate $$Q_M \sim pQ_v,$$

substituting $A\sqrt{[(P_1-P_2)/p]}$ for $Q_v$ $$Q_M \sim A\sqrt{\{p(P1-P2)\}}$$

reveals that the mass flow rate $Q_M$ is proportional to the differential pressure $\Delta P$, i.e., $$Q_M \sim \Delta P$$

The importance of this aspect will be further discussed below.

Figure 2:
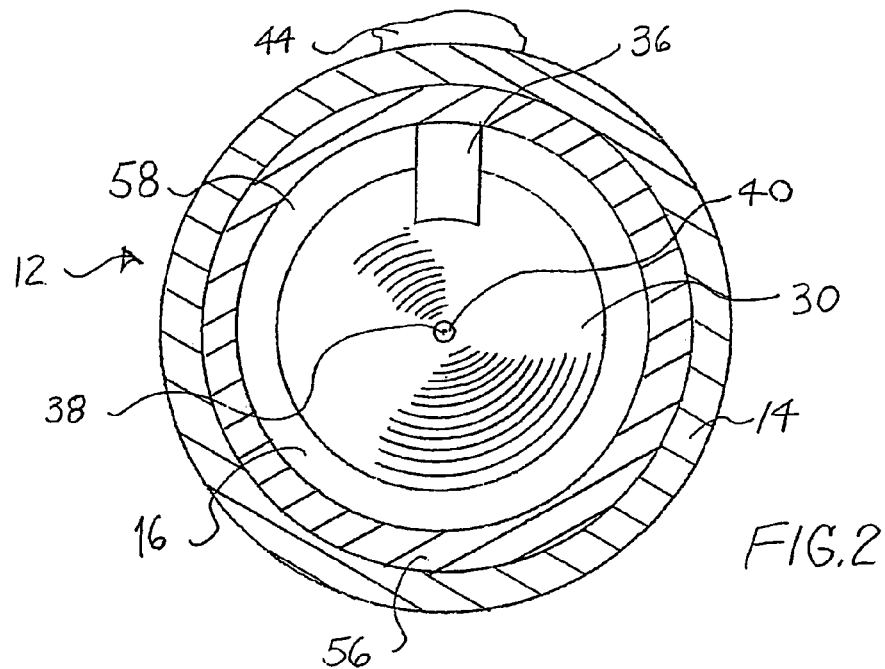
FIG. 2 is a transverse cross sectional view taken along line 2-2 of FIG. 1.
Figures 3, 4:
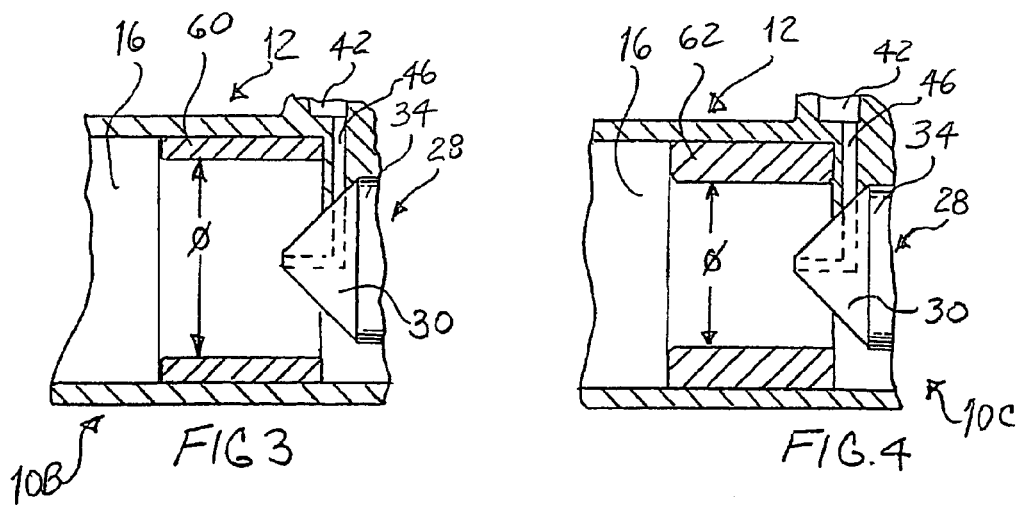
FIGS. 3-7 are partial cross sectional views depicting annular tuning members having different size orifices to illustrate variations of the preferred embodiment.
Figure 5:
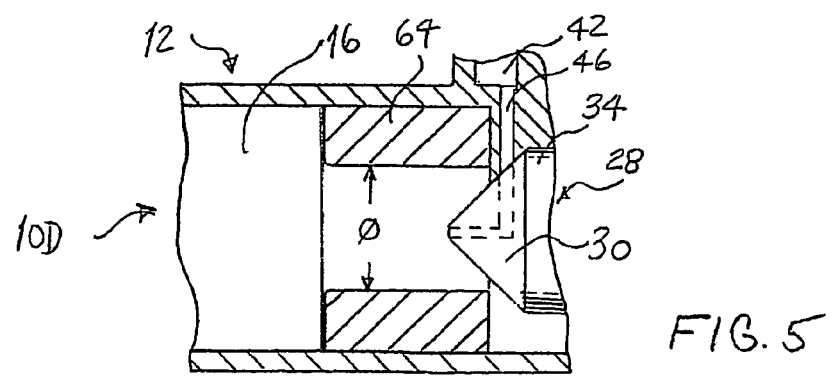
Figure 6:
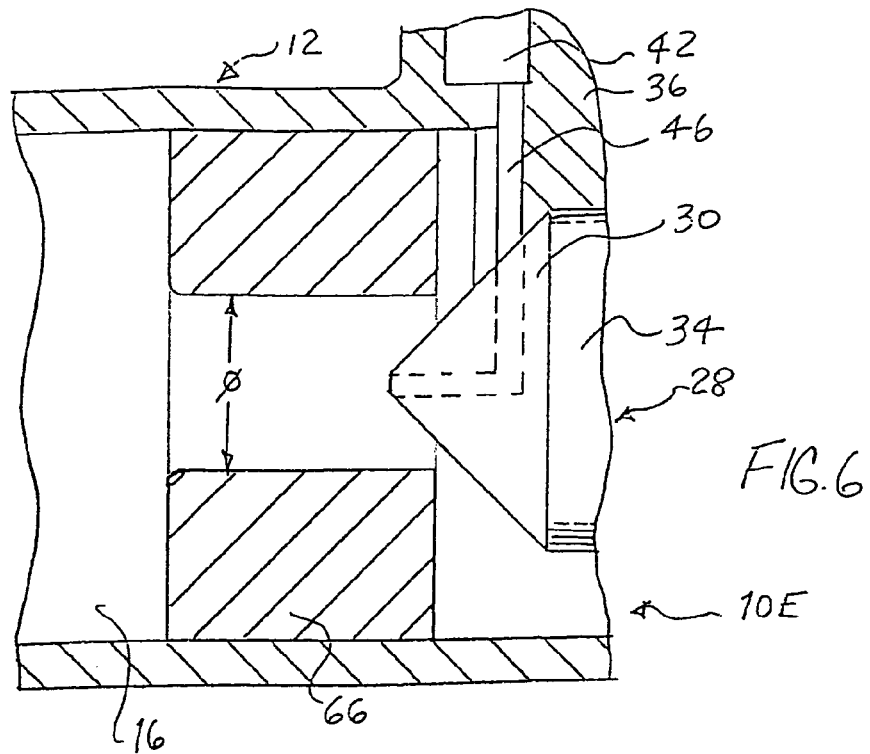
Figure 7:
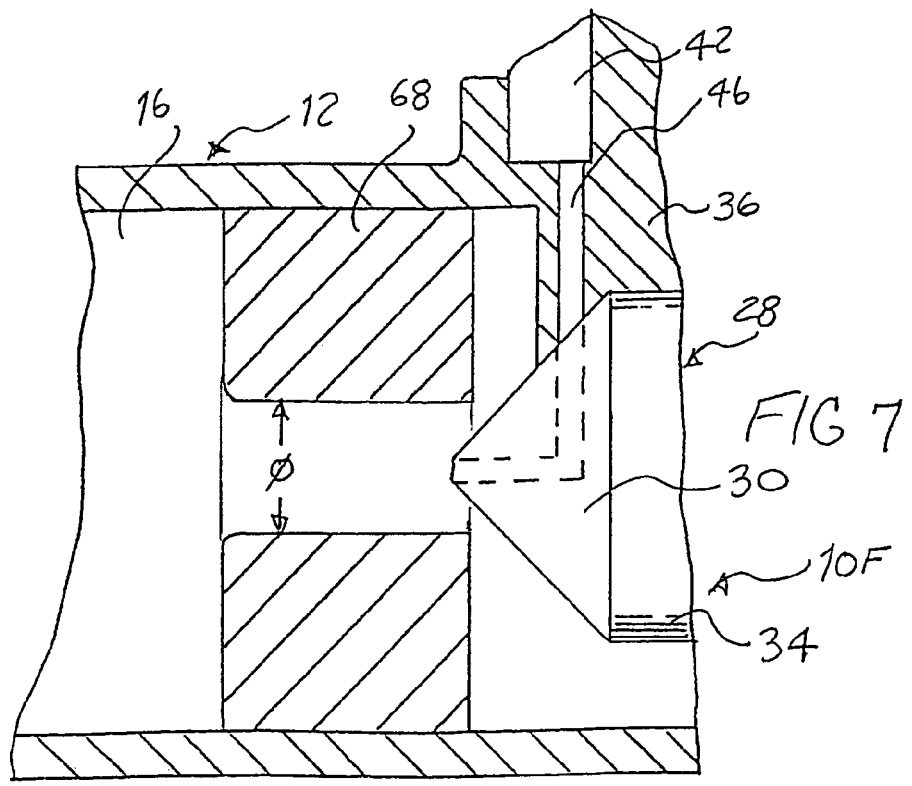

A tuning member 56 is also disposed within chamber 16 of housing 12 and is in the form of annular ring having an inside diameter forming an orifice 58 of a particular cross sectional configuration, Ø . As shown in FIGS. 1 and 2, orifice 58 is circular in configuration. Member 56 is placed within chamber 16 along axis 38 in order to lie in a selected position relative to flow body 28. As noted in FIG. 1, such positioning may be measured by the location of member 56 relative to the apex of the conical portion 30, denoted by the distance "Z". In addition, member 56 may be positioned within chamber 16 relative to the distance between its rearmost extremity and the aft most extremity of the cylindrical portion 30 of flow directing body 28, denoted by distance "X" in FIG. 1.

By varying the distances "X" and "Z" member 56 can be placed at particular positions within chamber 16 to maximize the ability of the apparatus 10 to produce accurate flow measurements of fluids passing through chamber 16 at various rates.

In essence, the dynamic pressures measured at P1 and P2 are measured by probes 40 and 50. The pressure differential value, $\Delta P$ is then determined and correlated to a particular mass flow rate through chamber 16 for particular fluids, fluids of a particular density, and at existing temperatures and pressures. Such flow rates are measured initially by a conventional flow meter. These determinations are then collated into tables which may be digitally recorded in order to predetermine or control the flow rate through chamber 16, or through a larger flow passageway within which the subject apparatus is disposed. In this manner, a particular dose or amount of fluid is accurately passed from entrance 24 to exit 26 of chamber 16.

Turning to FIGS. 3-7, it will be apparent that a housing 12 having a flow directing body 28 employed in the same manner as that depicted in FIG. 1 is shown. However, in these embodiments orifice tuning members 60, 62, 64, 66, and 68 of varying sizes (diameters Ø ) have been employed. It should be noted that orifices 66 and 68, FIGS. 6 and 7, do not lie against support means 36.

Each of the embodiments 10A, 10B, 10C, 10D, 10E, and 10F shown in FIGS. 3-7 produce a different operating range of accurate measurements of mass flow through housing 12. Each of the orifice members 56, 60, 62, 64, 66, and 68 may be constructed of any suitable material such as stainless steel, Lexan, and the like.

In the embodiments depicted in FIGS. 1-7, the combination of the orifice members 56, 60, 62, 64, 66, and 68 with the flow directing body 28, maintains a substantial laminar fluid flow passed the pressure probes P1 and P2. This elimination of turbulent conditions provides extremely accurate measurement of mass flow rate in the devices of the present invention. Thus, the operational problems associated with boundary layer growth and compressibility of fluids is virtually eliminated in the devices of the present invention.

With reference to FIGS. 8-12, graphs are shown generally comparing the mass flow of fluid, such as water, through chamber 16, and the measurements of $\Delta P$ (P1-P2) measured by the pressure probes 40 and 50. Such pressure measurements are generally measured in inches of water. In tests performed by the applicants, fluids, such as water, were introduced into entrance 24 of housing 12, passed through the chamber 16 having a particular orifice member, such as orifice 56, and a flow directing body 28 of a particular size, and out of exit 26. (It may be noted in passing that the flow direction through the subject apparatus may be reversed and still obtain similar results.) Pressure was measured by a conventional pressure measuring device and the flow rates were determined by a conventional flow measuring device.

Figure 8:
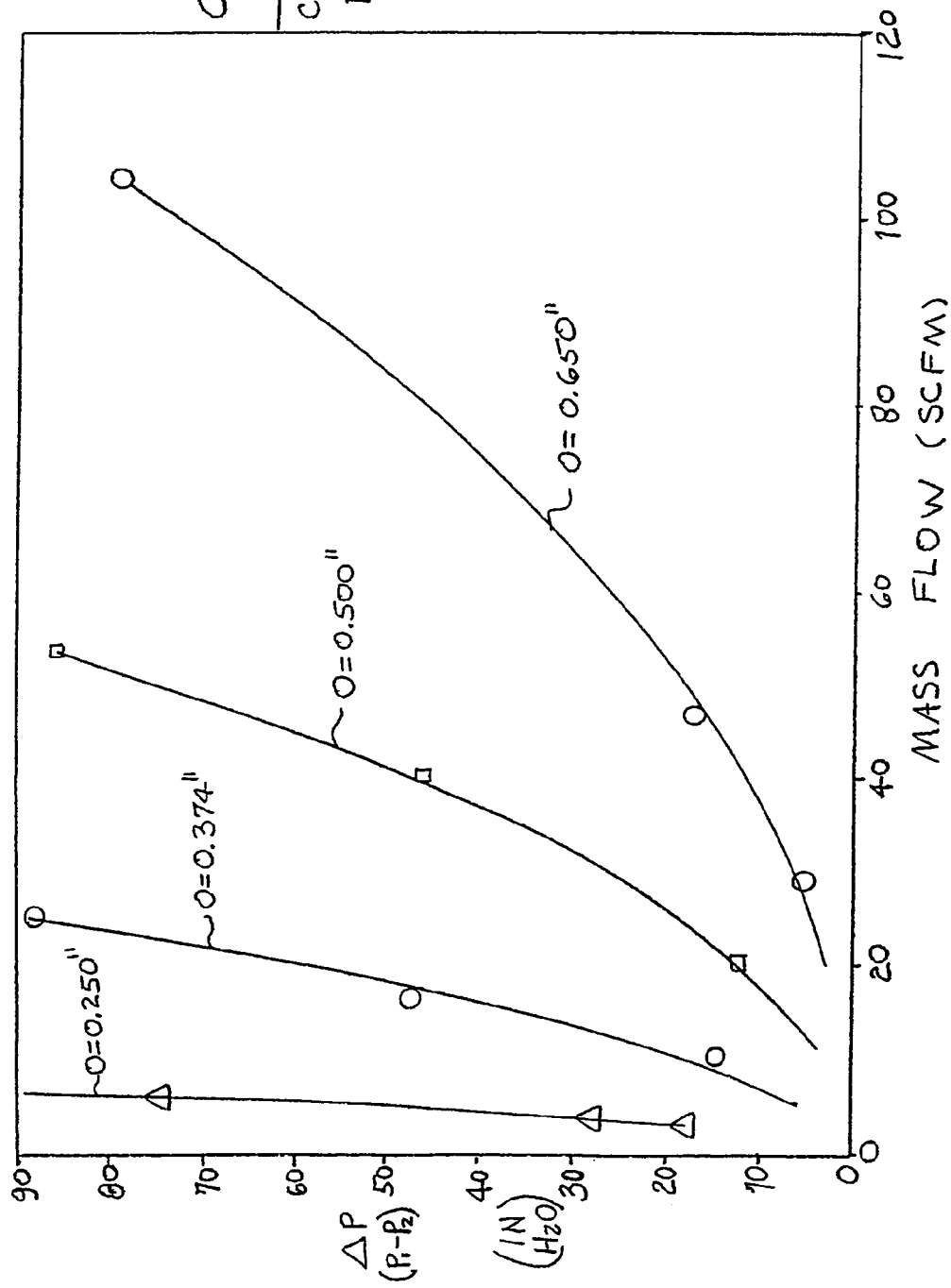
FIGS. 8 and 9 are charts graphically depicting measurements of different mass flow rates relative to dynamic pressure differential (ΔP) using different sized orifices in the apparatus of the present invention.
Figure 9:
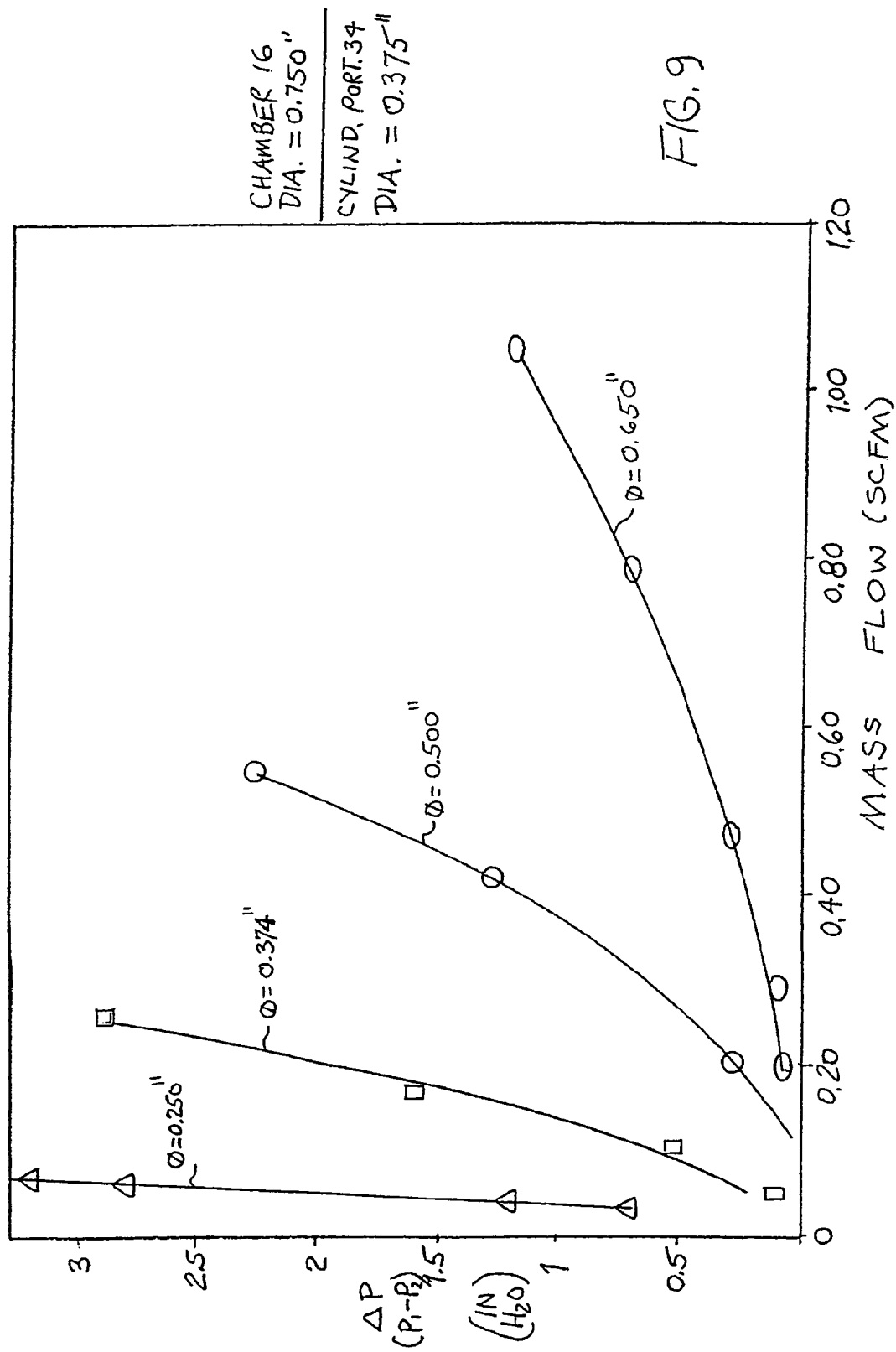
Figure 10:
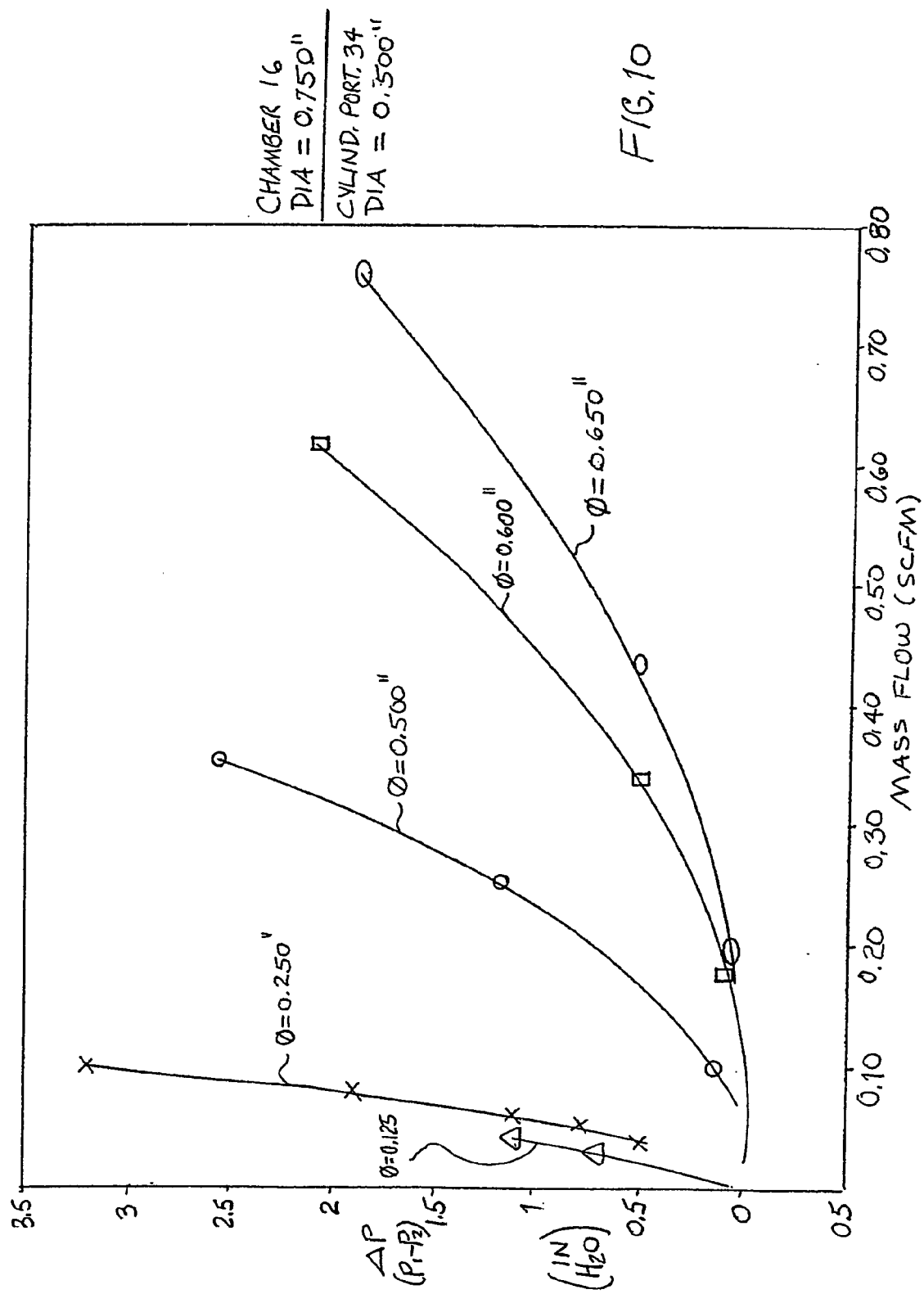
FIGS. 10 and 11 are charts graphically depicting different mass flow rates relative to ΔP for particular size orifices and flow directing bodies of larger diameters than those of the flow directing bodies of FIGS. 8 and 9.

FIGS. 8 and 9 graphically represent mass flow rates correlated to $\Delta P$ using four orifices, shaped like orifice member 56, having diameters varying between 0.25 inches and 0.65 inches. As may be seen, mass flow rates varied according to the $\Delta P$ determined by pressure probes 40 and 50. In general, the mass flow rates fall along predictable curves and may be linearized. This is achieved by using the values obtained and taking the square root of the same and further plotting those values to produce a straight line rather than a curve. It should be noted that at very low mass flow rates, (see FIG. 9) small mass flow rates are easily determined. The mass flow test results depicted in FIGS. 8 and 9 were made employing a flow body 26 having the cylindrical portion 34 at a diameter of 0.375 inches. FIG. 10 represents the use of a larger flow body 28 having a cylindrical portion 34 diameter of 0.500 inches. Using similar orifice members having orifices ranging between 0.250 inches and 0.650 inches produces similar results, i.e., a series of curves that are easily transformed into tabular form to predict the mass flow through chamber 16 by simply measuring $\Delta P$.

Figure 11:
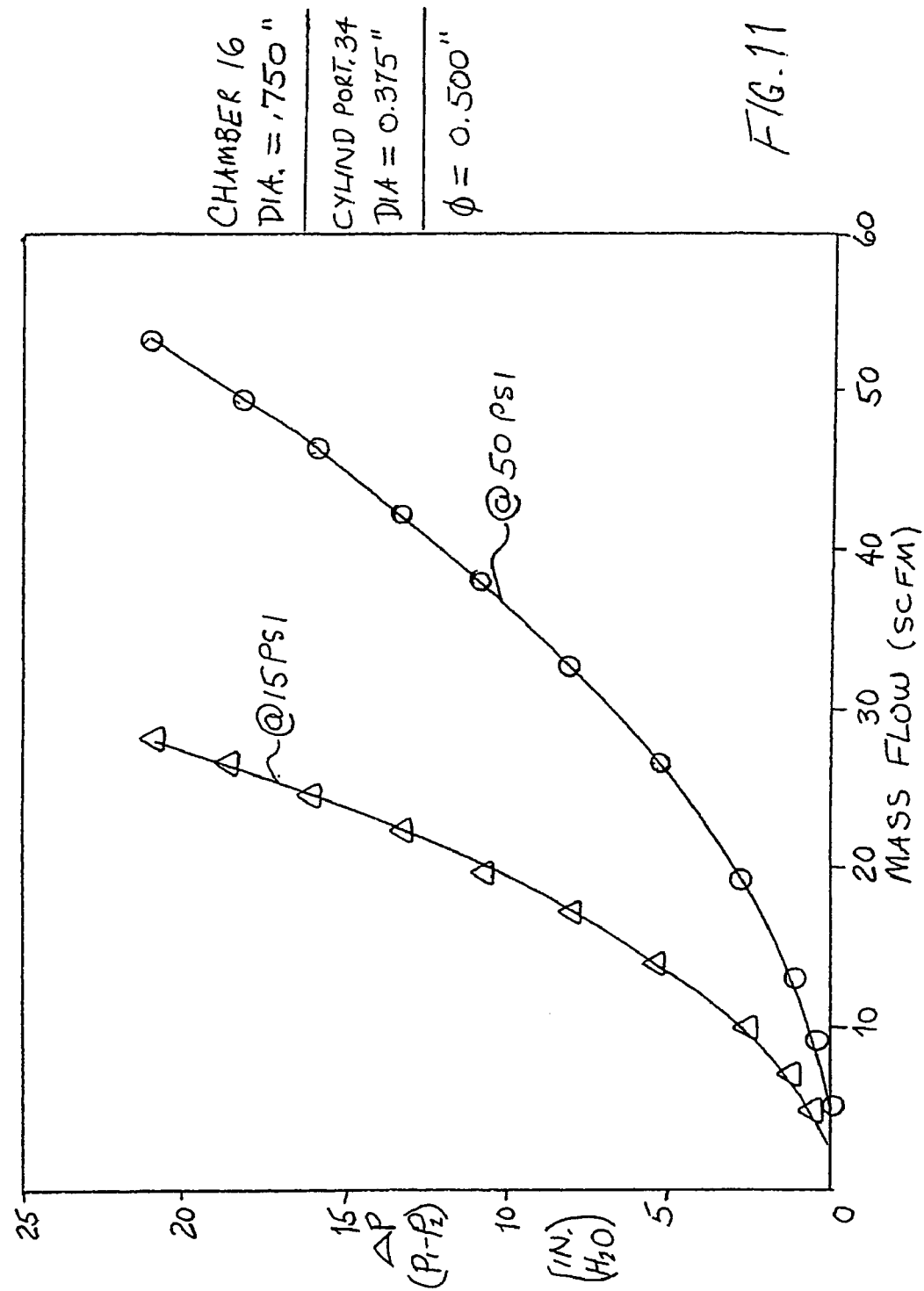

FIG. 11 shows the results of a typical test in which the chamber diameter and cylindrical portion 34 of flow body 28 are identical to that shown in FIGS. 8 and 9. However, the tests were respectively performed using a single orifice having a diameter of 0.500 inches, but at a first atmospheric pressure (15 PSI), and at a second higher pressure (50 PSI). As may be gleaned from FIG. 11, predictable independent curves result which are indicative of mass flow simply dependent on the measurement of $\Delta P$ and the external pressure.

Figure 12:
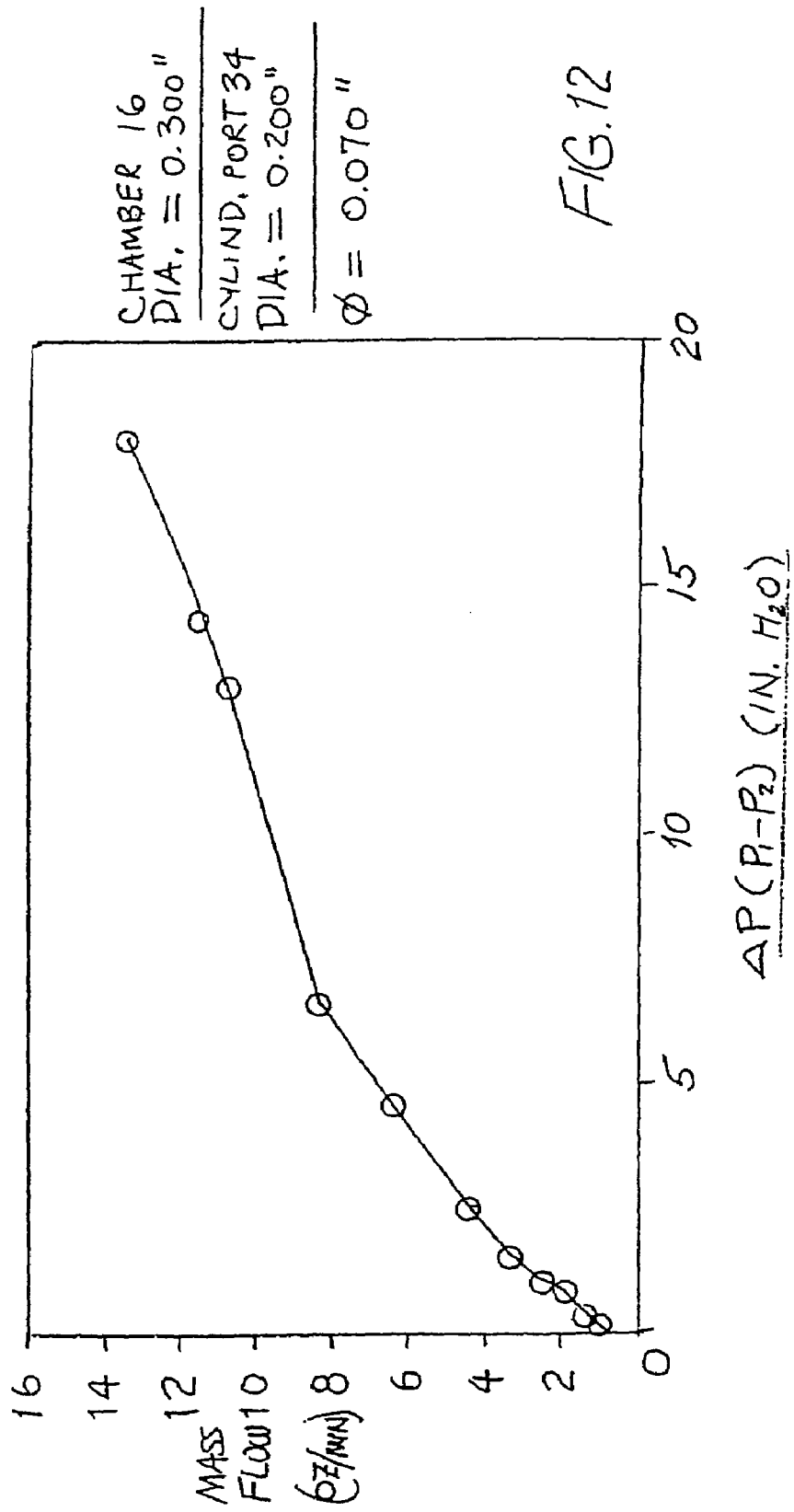
FIG. 12 is a chart graphically depicting very slow mass relative to ΔP for an extremely sized embodiment of the present invention measuring very low flow rates.

Further tests using the protocols shown in FIGS. 8-11 were performed at extremely low flow rates. FIG. 12 indicates the results of such tests in which chamber diameter was reduced to 0.300 inches, and a flow directing body having a cylindrical portion 34 with a diameter of 0.200 inches, combined with an orifice member having an orifice of 0.700 inches. Again, a reproducible curve is shown in which very small flow rates were determined by simply using a $\Delta P$ measurement, as previously described.

Thus, orifice members 56, 60, 62, 64, 66, and 68 may be likened to a flow lens which allows accurate measurements of flow rates through housing 12 at extremely low levels. Of course, such predictable mass flow rates are of a lower value than would have been had such orifice members not been employed.

In operation, a fluid is fed through chamber 16 of housing 12 either in the direction noted by directional arrow 22 of FIG. 1 or in the opposite direction. The flow directing body 28 creates a smooth stable flow stream to generate dynamic pressures P1 and P2 that are measured by probes 40 and 50. Thus, a $\Delta P$ (P1-P2) measurement can be determined, preferably automatically, and, through the use of tables or graphs, the mass flow rate through chamber 16 can be determined. Such graphs or tables may take into consideration other parameters such as the outside pressure, temperature, density of the fluid, type of fluid, and the like. Thus, for any fluid employed at a particular external parameter, the mass flow rate through housing 12 may be accurately determined. Fluid density may also be predicted from graphs or tables obtained as described above.

Although the preferred embodiments have been described above in terms of a generally cylindrical housing with annular focusing member and conical/cylindrical flow directing body components, since the principal objective of the structure is believed to be to facilitate measurement of two uniquely different dynamic flow pressures P1 and P2, it is anticipated that an elongated flow chamber having a generally rectangular (or oval) transverse cross section, combined with a focusing member having a generally rectangular (or oval) focusing orifice, and an elongated flow directing body extending transversely across at least a portion of the width of the chamber and including a central portion, a first tapered portion formed at one end of the central portion with its vertex facing the chamber entrance, and a second tapered portion formed at the opposite end of the central portion with its vertex facing the chamber exit, may also have application in some circumstances. Such embodiment would have a longitudinal cross section similar to that depicted in FIG. 1 except that the length of the flow directing body would extend into and out of the plane of the drawing rather than be circularly symmetric along the axis 38 as is the presently depicted body 28. In such case the length of the body could extend across the entire width of the chamber or have a length shorter than the chamber width in which case one or more struts or pylons could be employed to hold the body in place. Furthermore, it is anticipated that the pressure sensors and sensing points would be positioned within the chamber similar to that depicted in FIG. 1.

While in the foregoing, embodiments of the present invention have been set forth in considerable detail for the purposes of making a complete disclosure of the invention, it will be apparent to those of skill in the art that numerous alterations and variations may be made in such detail without departing from the invention as described herein. For example, rather than using a fixed annular ring to form the tuning member 56, a mechanically variable aperture could be used. Furthermore, means could be inserted in the downstream flow to allow a frequency signal to be obtained for use in enhancing the mass flow rate calculations. It is therefore intended that the appended claims be interpreted broadly to encompass all such alterations and variations, changes and extensions as fall within the true spirit and scope of the invention.

What is claimed is:

1. A fluid flow metering apparatus, comprising:
 a) a housing having a wall portion forming a flow chamber including an entrance and an exit for allowing fluid to be passed through said chamber;
 b) a flow directing body located in said chamber and including a first conical portion positioned adjacent said chamber entrance, a second conical portion positioned adjacent said chamber exit, and a cylindrical portion intermediately positioned relative to said first and second conical portions;
 c) support means for holding said body within said chamber;
 d) a tuning member located in said housing chamber at least in part between said body and said entrance to said housing chamber, said tuning member including an orifice of a predetermined size selected to focus the passage of fluid across said flow directing body;
 e) a first pressure probe communicating with said chamber, said first pressure probe obtaining a first pressure measurement at the apex of said first conical portion of said body; and
 f) a second pressure probe communicating with said chamber, said second pressure probe obtaining a second pressure measurement at said cylindrical portion of said body,
 wherein the size of the orifice in said tuning member is selected to determine the operational flow measuring range of the flow metering apparatus.

2. The apparatus of claim 1 in which said orifice of said member overlies a portion of said first conical portion of said body.

3. The apparatus of claim 1 in which said first pressure probe includes a passageway through said body.

4. The apparatus of claim 1 in which said second pressure probe includes a passageway through said support means.

5. The apparatus of claim 1 in which said tuning member lies immediately adjacent said support means in said housing chamber.

6. The apparatus of claim 5 in which said orifice of said tuning member overlies a portion of said first conical portion of said body.

7. The apparatus of claim 6 in which said first pressure probe includes a passageway through said body.

8. The apparatus of claim 7 in which said second pressure probe includes a passageway through said support means.

9. The apparatus of claim 1 in which said tuning member lies apart from said support means in said housing chamber.

10. The apparatus of claim 9 in which said orifice of said member overlies a portion of said first conical portion of said body.

11. The apparatus of claim 10 in which said first pressure probe includes a passageway through said body.

12. The apparatus of claim 11 in which said second pressure probe includes a passageway through said support means.

13. A fluid flow metering apparatus, comprising:
 a) a housing having an interior wall forming an elongated flow chamber including an entrance and an exit for allowing fluid to pass longitudinally through said chamber;
 b) a flow directing body located in said chamber and including a central portion, a first tapered portion formed at one end of said central portion with its vertex facing said entrance, and a second tapered portion formed at the opposite end of said central portion with its vertex facing said exit;
 c) support means for holding said body within said chamber;
 d) a flow focusing member located in said chamber at least in part between said body and said entrance, said focusing member including an orifice of a predetermined size aligned with said vertex to focus the flow of fluid onto said first tapered portion;
 e) a first pressure probe communicating with said chamber to obtain a first dynamic pressure measurement at the vertex of said first conical portion;
 f) a second pressure probe communicating with said chamber to obtain a second dynamic pressure measurement between said central portion and said wall portion; and
 g) means responsive to said first pressure measurement and said second pressure measurement and operative to develop a differential pressure proportional to the difference therebetween, said differential pressure being proportional to the rate of flow of said fluid through said chamber, wherein the size of the orifice in said focusing member is selected to determine the operational flow measuring range of the flow metering apparatus.

14. A fluid flow metering apparatus as recited in claim 13 wherein said interior wall is generally circular in cross section.

15. A fluid flow metering apparatus as recited in claim 14 wherein said central portion is generally cylindrical in configuration and is disposed substantially concentric with said interior wall.

16. A fluid flow metering apparatus as recited in claim 15 wherein said first and second tapered portions are generally conical in configuration.

17. A fluid flow metering apparatus as recited in claim 16 wherein said orifice is generally circular in configuration and is substantially concentric with the axis of said flow directing body.

18. A fluid flow metering apparatus as recited in claim 17 wherein said focusing member is selectively movable along said axis.

19. A fluid flow metering apparatus as recited in claim 13 wherein said focusing member is adjustable to the extent that the diameter of said orifice can be selectively varied between a first dimension and a second dimension.

20. A fluid flow metering apparatus as recited in claim 13 wherein said interior wall is generally rectangular in cross section.

21. A fluid flow metering apparatus as recited in claim 20 wherein said flow directing body is an elongated member the length of which extends across said chamber between opposing walls thereof, and wherein said central portion is generally rectangular in transverse cross section.

22. A fluid flow metering apparatus as recited in claim 21 wherein said first and second tapered portions are generally triangular in transverse cross section.

23. A fluid flow metering apparatus as recited in claim 22 wherein said orifice is generally rectangular in configuration.

24. A fluid flow metering apparatus as recited in claim 23 wherein said focusing member is selectively movable along said axis.

25. A fluid flow metering apparatus as recited in claim 24 wherein said focusing member is adjustable to the extent that at least one dimension of said orifice can be selectively varied between a first dimension and a second dimension.

\* \* \* \* \*